Oct. 25, 1955     T. U. MARRON     2,721,513
TOP FILM FOR STENCIL SHEET ASSEMBLY
Filed Feb. 2, 1951
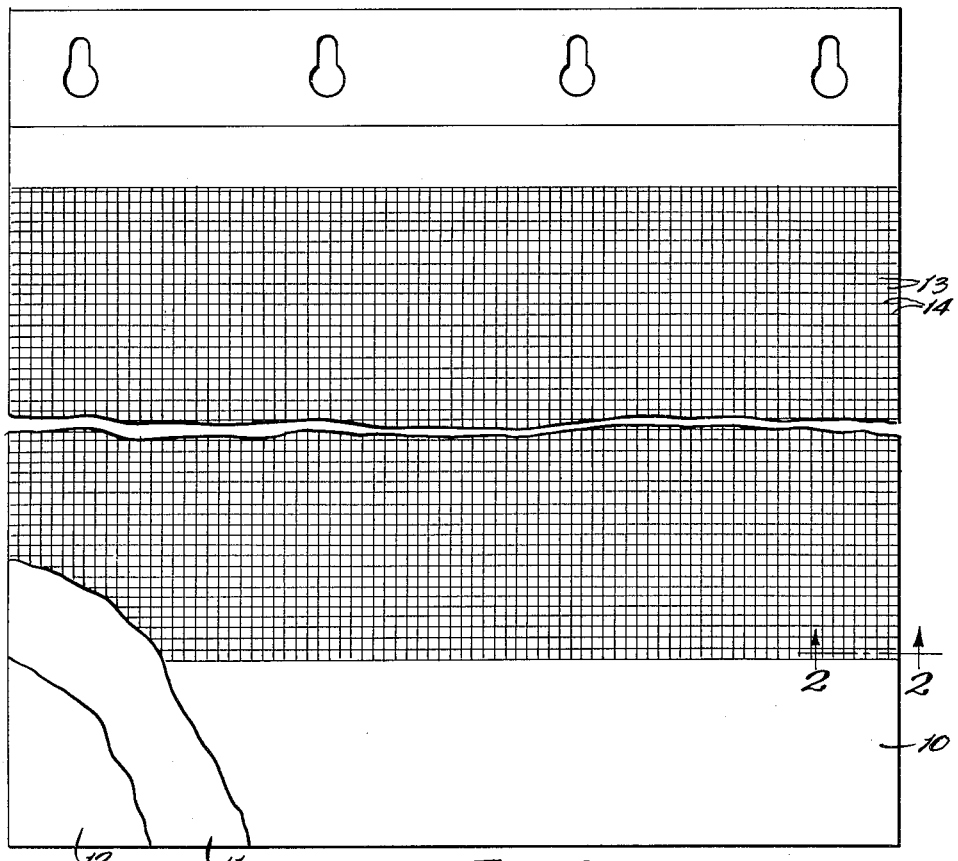
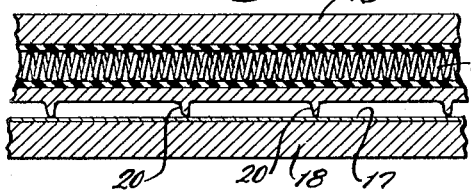 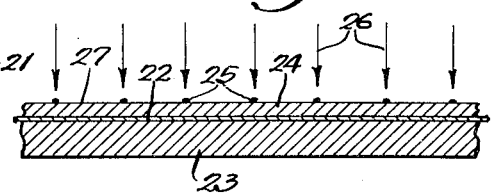
INVENTOR:
Thomas U. Marron,
BY
Dawson & Ooms,
ATTORNEYS.

United States Patent Office 2,721,513
Patented Oct. 25, 1955

2,721,513

TOP FILM FOR STENCIL SHEET ASSEMBLY

Thomas U. Marron, Chicago, Ill., assignor to A. B. Dick Company, Niles, Ill., a corporation of Illinois Application February 2, 1951, Serial No. 209,077

2 Claims. (Cl. 101—128.2)

This invention relates to stencil-sheet assemblies, and particularly to the structure of a protective film for use in combination with a stencilizable sheet in stencil manufacture.

As described in the Heath Patent No. 2,203,280, top films of the type described are usually formed of transparent plastic material, such as polyvinyl resin, rubber hydrochloride (Pliofilm), polyvinylidine chloride (Saran), chlorinated rubber, nitrocellulose and the like, with or without plasticizer. Such protective films are adapted to prevent cut-out and to protect the stencil sheet as well as the instruments with which stenciling operations are effected. For best results, a protective film should embody the characteristics of protection without handicapping the stencil-forming operations or the quality of the stencil sheet that is formed. It has been found that the protective film should be a highly extensible composition and should have a thickness ranging from about .0005 to .005 of an inch.

In the past, the top film has become highly wrinkled and substantially unfit for the purpose for which it was intended soon after contact with the stencilizable sheet or other surfaces having oily or plasticizing materials. In order to eliminate wrinkling of the top protective film, it was necessary to interleave between the stencilizable sheet and the top film and to provide other precautions in packaging to separate the top film from waxy or oily materials in cushion sheets or backing sheets used in stencil-sheet assemblies. Such techniques and precautions for guarding the protective film have been found to increase the expense of the product and have involved considerable time and materials in its packaging and use.

It has also been found that in the absence of an interleaver there is a tendency for the smooth surfaces of the top film and the coated stencilizable sheet to adhere and laminate to each other, such that maximum contact is effected to accelerate wrinkling and crazing and separation of the sheets when stenciling operations have been completed is rendered more difficult.

It is an object of this invention to produce a top film of the type described which is free of the limitations imposed by its environment and does not require special handling for assembly and use.

Another object is to produce and to provide a method for producing a protective top film of plastic material having the characteristics of substantial freedom from wrinkling when in position of use in substantial contact with a stencilizable sheet or in substantial contact with a backing sheet of a superposed stencil-sheet assembly when packaged.

A further object is to produce a new and improved top film for stencil duplication which enjoys marked reduction of adhesion or lamination to adjacent bodies, which has increased visibility with less wrinkling and which is simple and easy to prepare.

These and other objects and advantages of this invention will hereinafter appear, and for purposes of illustration, but not of limitation, an embodiment is shown in the accompanying drawing in which—

Figure 1 is a top plan view of a stencil-sheet assembly embodying features of this invention with portions broken away to show the arrangement of elements;

Figure 2 is a sectional elevational view taken substantially along the line 2—2 of Figure 1;

Figure 3 is a sectional elevational view showing apparatus for preparing top film embodying features of this invention, and Figure 4 is a sectional elevational view of another system for carrying out this invention.

There is reason to believe that wrinkling of the plastic top film results from a physical phenomenon based upon the development of differential molecular strain patterns upon contact of the plastic film with the stencil or other oily surfaces. The possible contact with oils, plasticizers or other molecular relaxing materials enables molecular readjustment and by influence of the molecular components themselves which may be under strain or by influence upon adjacent molecules, causes wrinkling or crazing.

Applicant has found that the wrinkling and crazing can be controlled and substantially completely eliminated by a mechanism for isolating small increments of the film from each other by introduction of a barrier therebetween. In the practice of this invention, applicant achieves the desired relationship by subdividing the top film into small segments separated by thermally treated portions of the same material. For this purpose, applicant subjects only minute, spaced-apart portions of the top film to a heat treatment such, for example, as closely spaced line sections in parallel and preferably criss-crossing arrangement. The effect secured is markedly different than that which results from the overall heating or annealing of the plastic film. When the entire film is heat-treated or annealed, the film wrinkles as before and, in fact, wrinkling is sometimes more pronounced because of the unequal strain patterns which exist in stretched plastic film.

In one system, closely spaced linear sections of the film are heated between cooperating dies to temperatures preferably in the flow temperature range for the particular plastic material whereby intermolecular and intramolecular channels of denatured or heat-treated plastic material are formed. At the same time, the linear pattern is embossed in the plastic film or sheet so that embossments extend a very short distance from one wall thereby serving greatly to reduce the area of continuous contact with the underlying stencil sheet, thus markedly reducing the adhesion and the tendency towards lamination thereto. Particular reduction of adhesion in this respect results from the arrangement of linear embossments which extend from the surface normally in contact with the stencil sheet.

Temperature conditions for heating the spaced linear sections of the plastic top film may range from a temperature just below the melting or decomposition temperature of the plastic composition of which the film is formed to a temperature corresponding to the flow temperature for the particular plastic wherein the desired physical or chemical changes may take place in the molecular system. In most instances, temperatures ranging from 50° C. to just below the melting temperature of the plastic composite of which the film is formed. Depending on the temperature of treatment, the time span should not be less than that to cause plastic flow under operating conditions, but should not be so long as to permit extensive lateral dissipation of the heat to adjacent positions of the plastic film. Heating may be made to take place in linear sections spaced from $\frac{1}{16}$ to $\frac{1}{2}$ inch apart. Excellent results flow from the arrangement of heat lines in closely spaced parallel relation whether the lines run horizontally, vertically or obliquely across the sheet or in circular or curvilinear patterns, it is preferred to use a criss-cross pattern completely to isolate one section from the other, such as exist in a waffle pattern, a diamond-shaped pattern, or the like.

Fig. 1 illustrates a stencil-sheet assembly comprising a top film 10 of plasticized rubber hydrochloride (Pliofilm) of about 0.0005 to 0.005 inch thickness. The top film is positioned over a stencilizable sheet 11 and the two are secured along their upper edge portion to a backing sheet 12. The top film is heat-set at a temperature of about 100° C. for a few seconds to have a waffle pattern across the usable area formed with crossing vertical and horizontal linear embossments 13 and 14, respectively, which are spaced about ten to the inch.

As shown in Figure 2, the heated lines form embossments 15 having curvilinear valley sections 16 therebetween.

As shown in Figure 3, the desired pattern of line heating may be accomplished by compressing the plastic film 17 between a pair of cooperating dies 18 and 19 having extending ribs 20 of the desired pattern on the molded surface of one of the die parts. By way of example, the die portion 19, which is heated by resistance coils 21 to about 100° C., is brought into molding relation with the opposite die 18 until the desired plastic flow or molecular barrier is achieved in the plastic film 17 upon compression between the heated die part 20 and the platen 18. The time for accomplishing such results requires only a fraction of a second up to 3 or 4 minutes at 100° C., while more time will be required at lower temperatures. The bottom die part 18 may be cooled to prevent heating up of the plastic film and to permit easy removal thereof.

By another technique, shown in Figure 4, the plastic sheet stock 22 of which the top film is to be formed is deposited upon a supporting platen 23 and superposed with a copy sheet 24 having the desired linear pattern formed of radiation absorbing—heat generating material 25. Upon radiation of the copy with light sources rich in infra-red, such as by a photographer's flash lamp, carbon arc lamp and the like, of suitable intensity, radiations 26 are reflected by the light colored surface 27 of the copy and absorbed by the material in the pattern 25 and converted into heat. The heat generated, which may be in the order of 100–500° F., developed within a fraction of a second up to a few seconds, depending upon the source of radiant energy, is transmitted to the plastic film 22 and causes desired thermal modification of the molecular components in positions corresponding to the line pattern in the copy.

It will be apparent from the description that I have produced and provided a method for producing a new and improved top film for stencil duplication which provides for a pattern of embossments and valleys that minimize contact between the stencil sheet and the protective film and sets up conditions which markedly reduce adhesion and the tendency to laminate. The tendency to resist wrinkling in the treated plastic film may also result from molecular isolation by the linear sections so that one molecule will have little, if any, effect on the strain pattern of the other.

It will be understood that numerous changes may be made in the details of construction, arrangement, and operation without departing from the spirit of the invention, especially as defined in the following claims.

I claim:

1. In the combination with a stencil sheet, a thin top film of a flexible thermoplastic material, said film having a pattern of linear embossments with valleys therebetween to minimize the contacting relation between the two adjacent surfaces and to subdivide the film into isolated areas which breaks up any strain pattern to minimize wrinkling.

2. The combination as claimed in claim 1 in which the linear embossments form a criss-cross pattern.

References Cited in the file of this patent

UNITED STATES PATENTS

| Number | Name | Date |
|---|---|---|
| 563,355 | Brodrick | July 7, 1896 |
| 1,651,744 | Van Derhoef | Dec. 6, 1927 |
| 1,855,198 | Oswald | Apr. 26, 1932 |
| 1,941,362 | Newcomb | Dec. 26, 1933 |
| 1,989,922 | Heath | Feb. 5, 1935 |
| 2,020,177 | Grove | Nov. 5, 1935 |
| 2,106,481 | Giles | Jan. 25, 1938 |
| 2,203,280 | Heath | June 4, 1940 |
| 2,256,093 | Land | Sept. 16, 1941 |
| 2,296,804 | Winnek | Sept. 22, 1942 |
| 2,339,145 | Callum | Jan. 11, 1944 |
| 2,503,758 | Murray | Apr. 11, 1950 |
| 2,511,024 | Toulmin | June 13, 1950 |
| 2,536,048 | Flanagan | Jan. 2, 1951 |
| 2,622,516 | Heath | Dec. 23, 1952 |